(12) United States Patent
Schilling et al.

(10) Patent No.: US 10,642,221 B2
(45) Date of Patent: May 5, 2020

(54) METHOD AND MASTER FOR PRODUCING A VOLUME HOLOGRAM

(71) Applicants: LEONHARD KURZ Stiftung & Co. KG, Furth (DE); OVD Kinegram AG, Zug (CH)

(72) Inventors: Andreas Schilling, Hagendorn (CH); Wayne Robert Tompkin, Baden (CH); Norbert Lutz, Ruckersdorf (DE); Achim Hansen, Zug (CH)

(73) Assignees: OVD KINEGRAM AG, Zug (CH); LEONHARD KURZ STIFTUNG & CO. KG, Fürth (DE)

( * ) Notice: Subject to any disclaimer, the term of this patent is extended or adjusted under 35 U.S.C. 154(b) by 76 days.

(21) Appl. No.: 15/543,076

(22) PCT Filed: Jan. 11, 2016

(86) PCT No.: PCT/EP2016/050391
§ 371 (c)(1),
(2) Date: Jul. 12, 2017

(87) PCT Pub. No.: WO2016/113226
PCT Pub. Date: Jul. 21, 2016

(65) Prior Publication Data
US 2018/0004156 A1    Jan. 4, 2018

(30) Foreign Application Priority Data

Jan. 14, 2015   (DE) .................... 10 2015 100 513

(51) Int. Cl.
*G03H 1/02*        (2006.01)
*G03H 1/20*        (2006.01)
(Continued)

(52) U.S. Cl.
CPC ......... *G03H 1/0248* (2013.01); *G02B 5/1842* (2013.01); *G02B 5/1861* (2013.01);
(Continued)

(58) Field of Classification Search
CPC ...... G02B 5/32; G02B 5/1828; G02B 5/1842; G02B 5/1861; G02B 27/48; G02B 27/288; G02B 27/4261; G03H 1/0476; G03H 1/20
See application file for complete search history.

(56) References Cited

U.S. PATENT DOCUMENTS 3,623,798 A    11/1971   Sheridon
6,721,075 B2    4/2004   Orr et al.
(Continued)

FOREIGN PATENT DOCUMENTS

DE    69506866    5/1999
DE    102006016139    10/2007
(Continued)

OTHER PUBLICATIONS

Colin E. Webb and Julian D.C. Jones, "Handbook of Laser Technology and Applications: vol. III," Institute of Physics Publishing Ltd., p. 2639 (2004).

*Primary Examiner* — Thomas A Hollweg
*Assistant Examiner* — Mary A El-Shammaa
(74) *Attorney, Agent, or Firm* — Hoffmann & Baron, LLP

(57) ABSTRACT

A method for producing a volume hologram with at least one first area in a first color and at least one second area in a second color includes,
  providing a volume hologram layer made of a photopolymer;
  arranging a master with a surface structure on the volume hologram layer;
  exposing the master using coherent light, wherein light which is incident on at least one first partial area of the
(Continued)

surface of the master is diffracted or reflected in the direction of the at least one first area of the volume hologram layer and light which is incident on at least one second partial area of the surface of the master is diffracted or reflected in the direction of the at least one second area of the volume hologram, and wherein the light diffracted or reflected by the first and second partial areas differs in at least one optical property.

38 Claims, 19 Drawing Sheets

(51) Int. Cl.
| | |
|---|---|
| *G03H 1/04* | (2006.01) |
| *G02B 5/18* | (2006.01) |
| *G02B 27/28* | (2006.01) |
| *G02B 27/42* | (2006.01) |
| *G03H 1/26* | (2006.01) |
| *G03H 1/00* | (2006.01) |
| *G03H 1/30* | (2006.01) |
| *G03H 1/22* | (2006.01) |

(52) U.S. Cl.
CPC ....... *G02B 27/288* (2013.01); *G02B 27/4261* (2013.01); *G03H 1/0476* (2013.01); *G03H 1/20* (2013.01); *G03H 1/0011* (2013.01); *G03H 1/0244* (2013.01); *G03H 1/202* (2013.01); *G03H 1/265* (2013.01); *G03H 1/30* (2013.01); *G03H 2001/0415* (2013.01); *G03H 2001/0482* (2013.01); *G03H 2001/0497* (2013.01); *G03H 2001/205* (2013.01); *G03H 2001/207* (2013.01); *G03H 2001/2263* (2013.01); *G03H 2001/2276* (2013.01); *G03H 2001/266* (2013.01); *G03H 2001/267* (2013.01); *G03H 2001/2635* (2013.01); *G03H 2210/52* (2013.01); *G03H 2222/12* (2013.01); *G03H 2222/13* (2013.01); *G03H 2222/31* (2013.01); *G03H 2222/36* (2013.01); *G03H 2223/12* (2013.01); *G03H 2223/13* (2013.01); *G03H 2223/15* (2013.01); *G03H 2223/19* (2013.01); *G03H 2223/22* (2013.01); *G03H 2223/53* (2013.01); *G03H 2240/15* (2013.01); *G03H 2240/41* (2013.01); *G03H 2240/43* (2013.01)

(56) References Cited

U.S. PATENT DOCUMENTS

| | | | |
|---|---|---|---|
| 7,215,451 | B1 | 5/2007 | Nishikawa et al. |
| 8,187,771 | B2 | 5/2012 | Staub et al. |
| 2015/0192897 | A1 | 7/2015 | Schilling et al. |

FOREIGN PATENT DOCUMENTS

| | | |
|---|---|---|
| DE | 102006061220 | 6/2008 |
| DE | 102007052951 | 5/2009 |
| DE | 102007052952 | 5/2009 |
| DE | 102012105571 | 1/2014 |
| EP | 0712012 | 5/1996 |
| GB | 2219872 A | 12/1989 |
| JP | H06118863 | 4/1994 |
| JP | 3722310 | 9/2005 |
| JP | 20102867 A | 12/2010 |

E)

F)

US 10,642,221 B2

METHOD AND MASTER FOR PRODUCING A VOLUME HOLOGRAM

This application claims priority based on an International Application filed under the Patent Cooperation Treaty, PCT/EP2016/050391, filed on Jan. 11, 2016, and German Application No. DE 102015100513.1, filed on Jan. 14, 2015.

BACKGROUND OF THE INVENTION

The invention relates to a method and a master for producing a volume hologram, a security element with such a volume hologram, as well as a security document with such a security element.

Holograms are used as security elements to protect security documents such as banknotes, passports, security cards or the like in order to achieve a high degree of protection against forgery. For mass-produced articles, surface relief holograms are often used which on the one hand do not generate an optimal image impression and on the other hand can be copied by molding the surface relief.

Volume holograms, also referred to as white-light holograms or reflection holograms, are usually produced by means of a master hologram to be exposed to light, depend on the light diffraction at the so-called Bragg planes of a transparent layer, whereby the transparent layer has local differences in refractive index, and generate a brilliant, but monochromatic image impression. They cannot be copied by molding a surface relief.

If volume holograms with several differently colored areas are to be produced, several masters must generally be used for the exposure of the volume hologram to light of different wavelength. When exchanging the masters, positioning inaccuracies necessarily occur which reduce the quality of the volume hologram.

SUMMARY OF THE INVENTION

An object of the present invention is therefore to provide a method and a master for the production of improved volume holograms. A further object of the invention is to provide a security element with an improved volume hologram, as well as a security document with such a volume hologram.

Such a method for producing a volume hologram with at least one first area in a first color and at least one second area in a second color comprises the steps of:
a) providing a volume hologram layer made of a photopolymer;
b) arranging a master with a surface structure on the volume hologram layer;
c) exposing the master using coherent light, wherein light which is incident on at least one first partial area of the surface of the master is diffracted or reflected in the direction of the at least one first area of the volume hologram layer and light which is incident on at least one second partial area of the surface of the master is diffracted or reflected in the direction of the at least one second area of the volume hologram, and wherein the light diffracted or reflected by the first and second partial areas differs in at least one optical property.

The invention furthermore relates to a master for use with such a method, comprising a surface structure with a first and a second partial area which differ in their optical properties.

By means of the described method, a security element with a volume hologram layer can be obtained, in which layer a volume hologram with at least two areas each with a different color is formed.

By a security element can be meant, for example, a transfer film, a laminating film or a security thread for a document, a banknote or the like.

Using a security element of this type a security document can be produced, which is formed in particular as an identification document, passport document, visa document, credit card, banknote, security or the like. The security element can be arranged in particular in a window of the security document, i.e. in a transparent area, in particular a through hole in the security document.

With a method of this type it is thus possible to produce multicolored volume holograms using a single master, wherein, however, the exposure does not have to take place in register with the master. The differently colored areas are nevertheless always arranged in perfect register, that is to say in the desired fixed positional relationship, relative to each other and in perfect register with the diffractive motif-forming structures of the master. In contrast to the use of several masters for successive exposure steps, no additional steps have to be taken in order to ensure the in-register, i.e. positionally accurate arrangement of the respective color areas. The method is therefore both particularly simple and particularly reliable. It furthermore enables very high resolutions of the differently colored areas, in particular in the micrometer range.

By registration-accurate or register-accurate is meant the relative positionally accurate position of two elements or areas with respect to each other. The positionally accurate positioning can be effected in particular by means of optically detectable registration marks or register marks. These registration marks or register marks can either represent particular separate elements or areas or themselves be part of the elements or areas to be positioned.

An area can be coherent or consist of spatially separate sub-areas.

It is preferred if the light diffracted or reflected by the first and second partial areas differs by at least 10%, preferably by at least 50% in intensity for a predetermined diffraction order and/or polarization and/or reflection direction and/or wavelength.

In this way, it is possible to produce the areas of the volume hologram also with exposure over the whole surface of the master, i.e. it is not necessary to expose the first and second partial areas of the master separately in order to produce the differently colored areas. This facilitates the precise control of the exposure process and thus enables in particular the above-named high resolutions.

In a preferred embodiment, a master with binary gratings of different depths is used.

Binary gratings are gratings with an essentially rectangular grating profile. Elevations and valleys with essentially perpendicular edges thus alternate. Deep binary gratings can be designed such that they act like a mirror for a first wavelength, i.e. reflect strongly in the zero order, but have a weak zero order for a second wavelength and rather diffract this strongly in the first order. This is achieved by realizing the two binary gratings not with a phase depth of $\pi/2$, but with a phase depth of $\pi/2+n*2\pi$, wherein n is a small integer and represents the "overphasing" factor. With this so-called "overphasing" of binary or multilevel gratings (e.g. described in Handbook of Laser Technology and Applications: Volume III: Applications by Colin E. Webb, Julian D. C. Jones, Institute of Physics Publishing Ltd., p. 2639), the desired effect is achieved and the desired wavelength-specific partial areas of the master can be produced particularly easily.

For this purpose, it is advantageous in particular if a master is used which has a binary grating with a different structure depth in the first and second areas.

For a given wavelength and grating period, the intensity of the beams diffracted in the zero or first order is essentially determined by the structure depth, with the result that the desired wavelength selectivity can be achieved particularly easily in this way. The optimal structure depth depends here on the refractive index of the covering photopolymer.

It is particularly expedient if a master is used which in the first partial area has a structure depth of from 350 nm to 510 nm, preferably 400 nm to 460 nm, and in the second partial area has a structure depth of from 450 nm to 630 nm, preferably from 510 nm to 570 nm. The precise values depend here on the refractive index of the covering photopolymer as well as the exposure wavelengths. The refractive index was assumed in the present case to be n=1.51. For the illumination wavelengths, 640 nm (red) and 532 nm (green) were assumed. For different wavelength pairs, different structure depths accordingly apply.

In the first partial area, such a master has a strong zero order and a weak first order for red light and in the second partial area a strong zero order and a weak first order for green light. In this way, optically attractive two-colored, red-green volume holograms can thus be produced.

It is accordingly possible to produce differently colored volume holograms with differently designed masters. In particular, the following color combinations are of interest, for example: red-turquoise, red-blue, orange-turquoise, orange-blue, yellow-turquoise, yellow-blue. The structure depths for the two binary gratings of a particular color combination are obtained by using the "overphasing" described above and determining the "overphasing" factor "n", such that one binary grating acts like a mirror for a first wavelength, i.e. reflects strongly in the zero order, but has a weak zero order for a second wavelength and rather diffracts strongly into the first order. For this, calculations are generally carried out by means of precise electromagnetic diffraction theory.

It is furthermore advantageous if a master is used which has a grating period of from 500 nm to 10,000 nm, preferably from 1000 nm to 3000 nm.

Alternatively, it is also possible to use a master which has a multistep, in particular four-step grating. Like a binary grating, such a grating has essentially perpendicular edges, yet does not consist of a regular sequence of valleys of equal depth and elevations of equal height, but rather of a repeating sequence of a plurality of steps with increasing and decreasing structure depth respectively. Such structures, also known as phase gratings, have a particularly high wavelength sensitivity and can be used in particular to produce more than two colors in the volume hologram. When three primary colors, e.g. RGB (Red Green Blue), and a corresponding color grid are used, the production of true-color holograms with high register accuracy is thus possible.

It is advantageous if a master is used the structure depth of which differs by from 80 nm to 600 nm, preferably from 120 nm to 400 nm, between adjacent steps.

It is furthermore possible for a master with a blazed grating to be used. In contrast to the binary gratings already described, blazed gratings have a sawtooth-shaped cross-sectional profile. Depending on the angle of incidence during the exposure, the diffraction angle of the diffracted light also changes and consequently also the distance between the Bragg planes in the exposed volume hologram. In this way, multicolored holograms can likewise be produced using a single master.

It is expedient if a master is used in which the blazed grating is arranged on planes inclined relative to each other in the first and in the second partial area, wherein the absolute angle of inclination of the blazed gratings arranged in the first and second partial areas is preferably different with respect to the plane spanned by the volume hologram layer. In the case of such a master, if the angle of incidence of the light used for the exposure relative to the surface normal of the master is kept constant, different angles of incidence relative to the blazed gratings arranged there nevertheless result for the partial areas, with the result that, for the light diffracted towards the areas of the volume hologram, different diffraction angles and thus different colors arise in the areas. This enables a particularly simple exposure.

It is advantageous if the planes are inclined by from 5° to 90°, preferably from 20° to 60°, with respect to each other.

It is also possible for a master to be used which has a Fabry-Pérot layer system. Such a layer system can also be used for realizing a wavelength-selective master. Systems of this type comprise a partially reflective, in particular semi-transparent layer and a reflective, in particular opaque layer, between which an in particular transparent spacer layer is arranged. A portion of the incident light is reflected at the partially reflective layer, a further portion penetrates it and is reflected at the reflective layer. The wavelength selectivity results from the interference of the two resulting reflected partial beams and can be adjusted through the layer thickness of the spacer layer.

The layer thickness of the spacer layer is typically between 100 nm and 500 nm; however layer thicknesses down to 50 nm or to several micrometers are also conceivable.

It is expedient if a distance between the planes of the Fabry-Pérot layer system differs by from 10 nm to 200 nm, preferably from 20 nm to 100 nm, between the first and the second partial area. By the distance between the planes is meant the layer thickness of the spacer layer described above.

In a further preferred embodiment, a master is used in which a polarizing surface structure is provided in the first and/or second partial area. A selective exposure of the partial areas is hereby facilitated. If, for example, in the first partial area a polarizing surface structure is provided and the master is irradiated with light, the plane of polarization of which is perpendicular to the plane of polarization of this structure, the first partial area is selectively excluded from the exposure. For example, light of a different wavelength which is polarized parallel to the polarizing surface structure can then be used for the exposure, with the result that the first partial area is now selectively exposed. By polarization can be meant here both linear and circular polarization.

It is particularly expedient if a master is used in which the direction of polarization of the polarizing surface structure differs between the first and the second partial area.

A master can, for example, be used for this purpose which has in each case in the first and second partial areas a zero-order diffraction structure with a grating period which is smaller than the wavelength of the light used for the exposure of the master, wherein the diffraction structures influence the polarization of the incident light differently.

Both partial areas can hereby be selectively exposed in the described manner. It is particularly advantageous if the planes of polarization in the first and second partial areas are perpendicular to each other.

It is further expedient if the exposure takes place in at least two successive exposure steps.

The different optical properties of the two partial areas of the master can hereby be utilized to produce the differently colored areas of the volume hologram. A repositioning of the master is not necessary, with the result that a very good register accuracy can be achieved.

It is advantageous if the exposure steps are carried out at a different wavelength and/or different exposure angle and/or different direction of polarization of the incident light.

The selected optical properties of the light used for the exposure conform with the optical properties of the partial areas of the master, as already explained above.

It is expedient if one of the exposure steps is carried out at a wavelength of from 600 nm to 660 nm, preferably from 620 nm to 640 nm, and another of the exposure steps is carried out at a wavelength of from 500 nm to 560 nm, preferably from 520 nm to 550 nm. Red-green holograms can hereby be produced. This is advantageous in particular when a master with a binary or phase grating is used. If different wavelengths are used for the exposure, different colors can also be produced. For example, yellow or orange holograms can be produced by an exposure with lasers in the range of from 560 nm to 590 nm and blue holograms can be produced by exposure with lasers in the range 400 nm to 480 nm.

It is furthermore expedient if the planes of polarization of the light used for two of the exposure steps differ by 90°. The different directions of polarization can be combined with different wavelengths in order to achieve the desired color effect.

It is further advantageous if at least one of the exposure steps is carried out over the whole surface. Solid color surfaces can hereby be produced in the hologram.

It may, however, also be advantageous to carry out at least one of the exposure steps in a grid. This is expedient in particular if small, i.e. highly resolved, color areas forming the grid are to be combined in order to produce a mixed color impression. A grid arrangement may also be expedient for the production of a light colored background for a motif.

It is advantageous if the grid is a dot or line grid.

By dot grids are generally to be meant grids which are composed of distinct, small elements. These can be circular, but also adopt different structures such as, for example, stars, squares, alphanumeric characters and the like.

The grid preferably has a grid width of from 30 μm to 500 μm, particularly preferably from 50 μm to 300 μm.

It is furthermore expedient if a plurality of exposure steps is carried out in which the exposure takes place in each case in dot grids offset with respect to each other. The rotation of the grids with respect to each other can, for example, be varied.

It may also be sensible to use a dot or line grid in a first exposure step and to expose over the whole surface in a second step.

In particular, it is advantageous to carry out the individual exposure steps at different wavelengths, in particular in the case of the primary colors, e.g. RGB (Red Green Blue). In this way, gridded true-color holograms can be produced.

The exposure preferably takes place with a light intensity of from 2 mJ/cm² to 200 mJ/cm², preferably from 5 mJ/cm² to 50 mJ/cm².

It is further advantageous if the first and/or second area forms a design element, in particular a symbol, logo, image, in particular a portrait or an alphanumeric character.

It may, however, also be provided that one area provides an item of information and the other area forms the surround or background from which the item of information stands out. The item of information can, for example, be a logo which appears light against a dark background in one observation position and dark against a light background in the other observation position. It may thus be provided that, when the volume hologram is tilted or moved, a change from a positive representation to a negative representation occurs and vice versa. Furthermore, the areas can be formed such that one area forms the edge of the other area. One area can thus, for example, reproduce the border of an alphanumeric character and the other area the alphanumeric character itself.

In order to obtain a hologram with long-term stability, the volume hologram layer which is formed in particular from UV-curing polymers is furthermore fixed by curing, in particular by means of UV radiation, after the exposure.

The volume hologram can be combined with other security features in a security element and/or on a security document. In particular, diffractive and/or refractive surface relief structures which, with a reflection layer intensifying the optical effect, consist e.g. of vapor-deposited or printed-on semi-transparent or opaque metal and/or of transparent HRI layers (HRI=High Refractive Index), e.g. of metal oxides or nanoparticles such as e.g. a mixture of poly (dibutyl titanate) polymer and poly(styrene allyl alcohol) copolymer or of zinc sulfide and titanium dioxide, can also be arranged adjacent to and/or overlapping the volume hologram. It is preferred here for the HRI layer to have a refractive index of more than 1.8, further preferably of more than 2.0.

It is also possible to arrange security prints applied by known printing processes, for example one or more guill-oches composed of very fine, in particular multicolored lines, adjacent to and/or overlapping the volume hologram.

By means of combinations of this type, wherein the respective different security features have a very high register accuracy relative to each other, the optical effect, but also the protection against forgery of such a security element or security document can be further increased.

In particular, the security features combined with each other can form a common overall motif, wherein in each case different motif elements are formed from different security features.

A master used for the described method preferably comprises a metallic base body, in particular made of nickel.

BRIEF DESCRIPTION OF THE DRAWINGS

The invention is now explained in more detail with reference to embodiment examples. There are shown in.

DETAILED DESCRIPTION OF THE INVENTION

Figure 1:
FIG. 1 a schematic representation of an embodiment example of a multicolored volume hologram.
Figure 2:
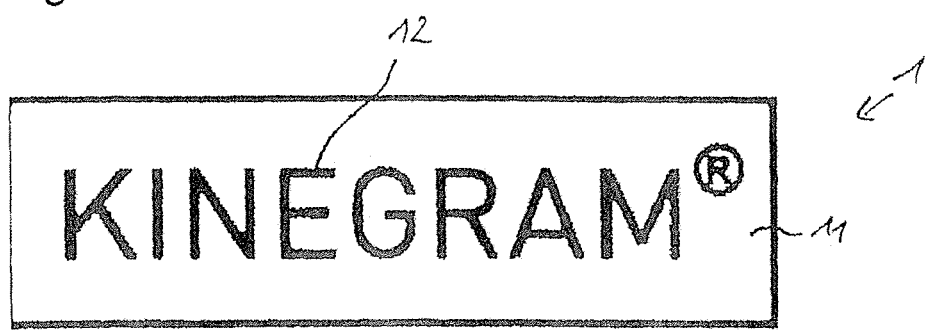
FIG. 2 a schematic representation of an alternative embodiment example of a multicolored volume hologram.

In FIGS. 1 and 2, two embodiment examples of volume holograms 1 are shown which each have areas 11 with a red color and areas 12 with a green color. In the embodiment example according to FIG. 1, the areas 11, 12 form a graphic motif in the form of flowers, in FIG. 2 lettering.

In general, the areas 11, 12 can form graphic motifs in the form of a symbol, a logo, an image or an alphanumeric character.

It may, however, also be provided that one area 11, 12 provides an item of information and the other area 12, 11 forms the surround from which the item of information stands out. The item of information can, for example, be a logo which appears light against a dark background in one observation position and dark against a light background in the other observation position. It may thus be provided that, when the volume hologram is tilted or moved, a change from a positive representation to a negative representation occurs and vice versa. Furthermore, the areas 11, 12 can be formed such that one area 11, 12 forms the edge of the other area 12, 11. One area can thus, for example, reproduce the border of an alphanumeric character and the other area the alphanumeric character itself.

In order to produce such a volume hologram, a volume hologram layer made of a photopolymer is exposed to coherent light by irradiation of a master 2. The photopolymer is preferably a photopolymer in which the desired changes in refractive index can be triggered by exposure or irradiation. The photopolymer is, for example, the Omni DX 706 photopolymer from DuPont. Further examples are silver halide emulsions, liquid photopolymer or dichromatic gelatin with a layer thickness of from 3 μm to 100 μm.

When the master 2 is exposed, light which is incident on at least one first partial area 21 of the surface of the master 2 is diffracted or reflected in the direction of the at least one first area 11 of the volume hologram layer and light which is incident on at least one second partial area 22 of the surface of the master 2 is diffracted or reflected in the direction of the at least one second area 12 of the volume hologram. The light diffracted or reflected by the first and second partial areas differs in at least one optical property.

Figure 21:
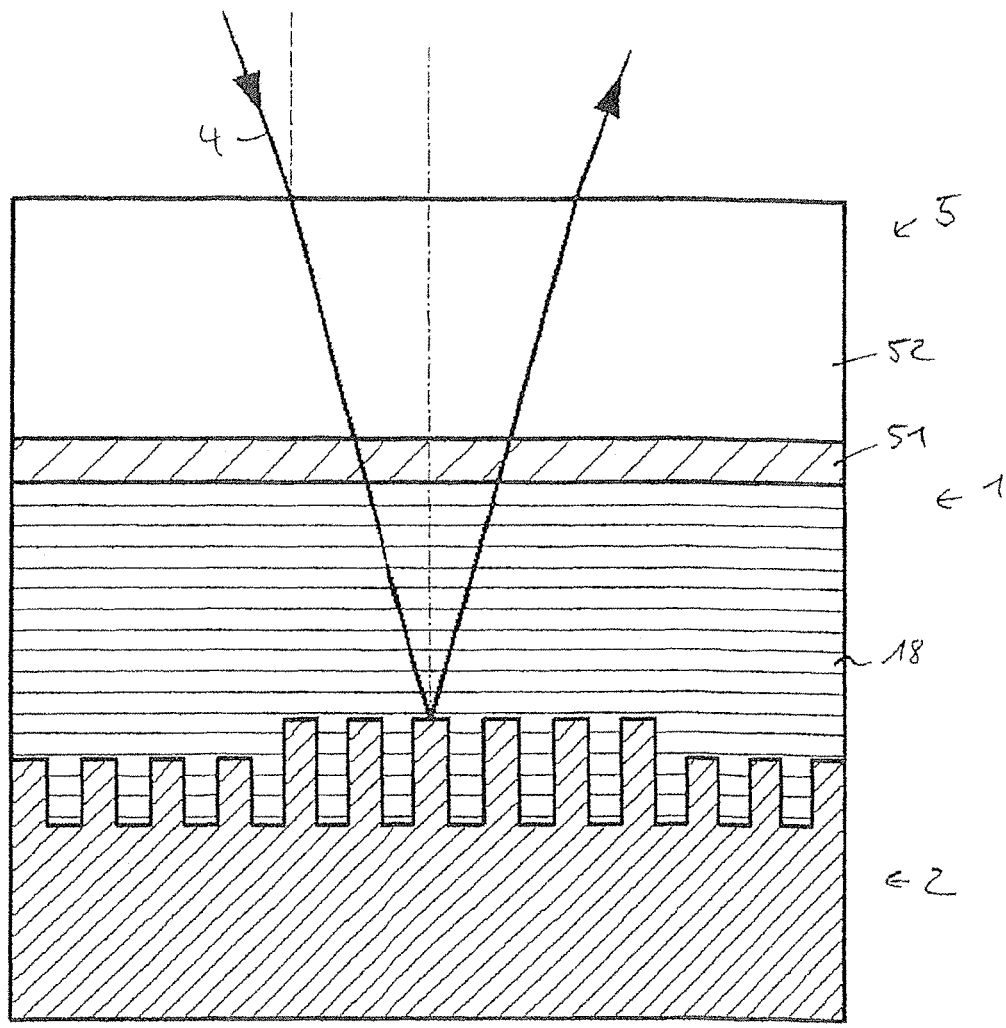
FIG. 21 a schematic illustration of the exposure of a volume hologram.

This is illustrated in detail in FIG. 21. The volume hologram 1 is brought into direct contact with the master 2 during the exposure such that an incident laser beam 4 is diffracted by the master 2 into a photopolymer layer 18 of the volume hologram 1 and there can interfere with the incident beam. A further layer structure 5 which here comprises a varnish layer 51 and a carrier film 52 is attached to the photopolymer layer 18.

With a method of this type it is thus possible to produce multicolored volume holograms 1 using a single master 2. The differently colored areas 11, 12 are therefore always arranged in perfect register, that is to say in the desired fixed positional relationship, relative to each other.

It is preferred if the light diffracted or reflected by the first partial area 21 and second partial area 22 differs by at least 10%, preferably by 50% in intensity for a predetermined diffraction order and/or polarization and/or reflection direction and/or wavelength.

The master 2 preferably comprises a metallic base body, in particular made of nickel, on the surface of which the surface structures are formed.

Figure 22:
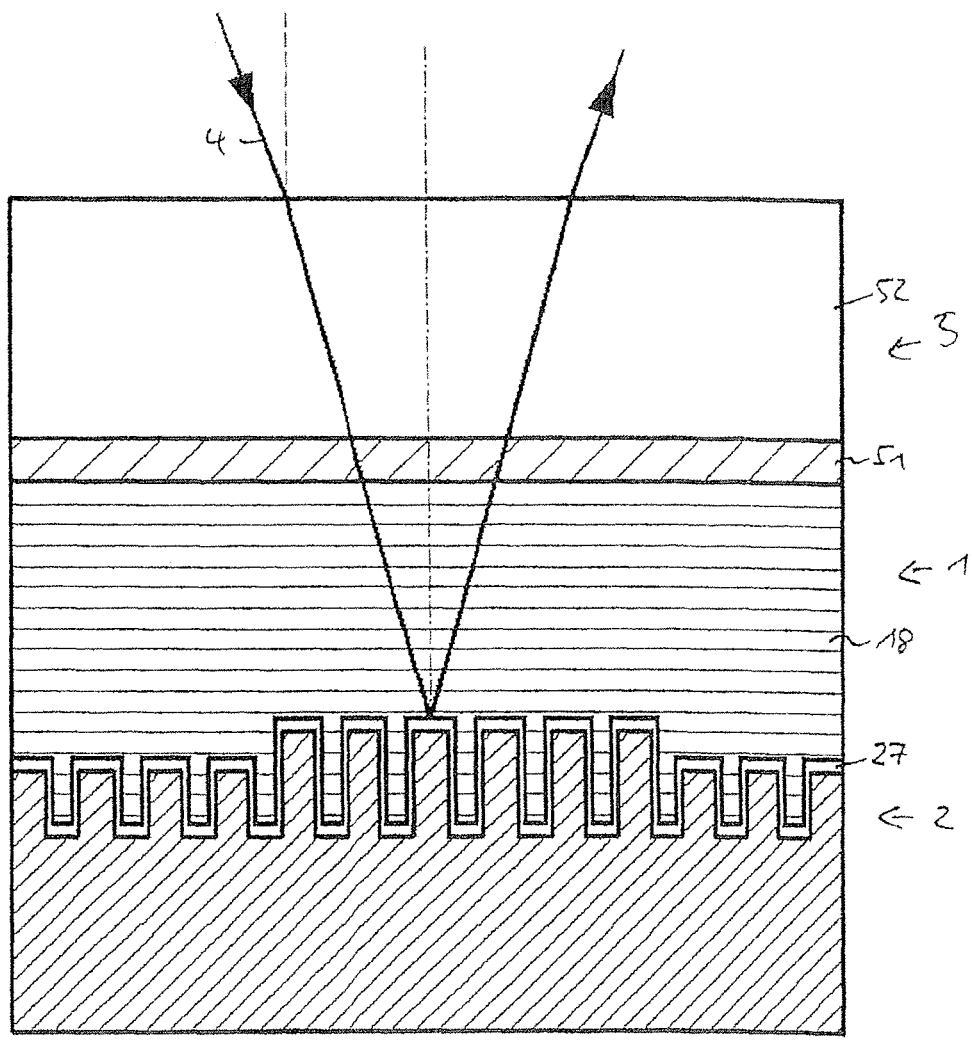
FIG. 22 a schematic illustration of the exposure of a volume hologram by means of a master with a sealing wax layer.
Figure 23:
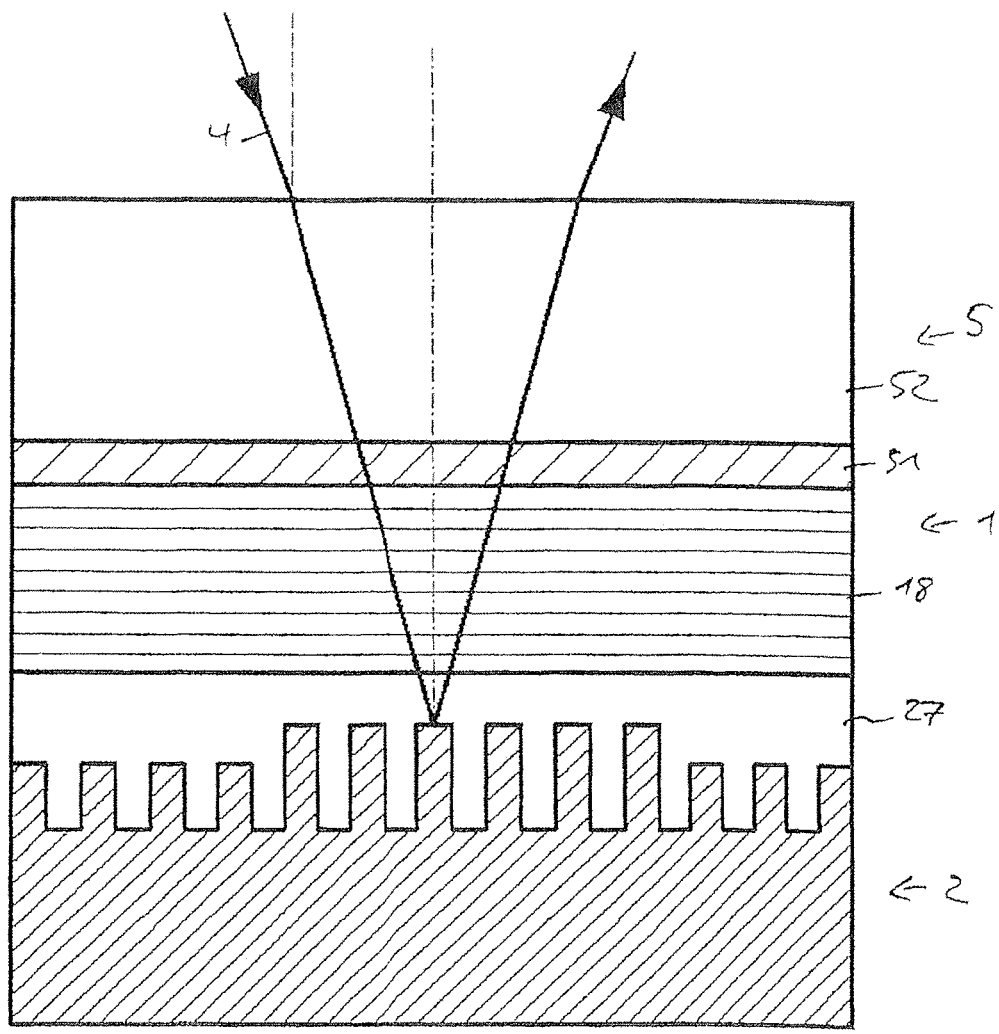
FIG. 23 a schematic illustration of the exposure of a volume hologram by means of a master with a sealing wax layer leveling off the surface structures.
Figure 24:
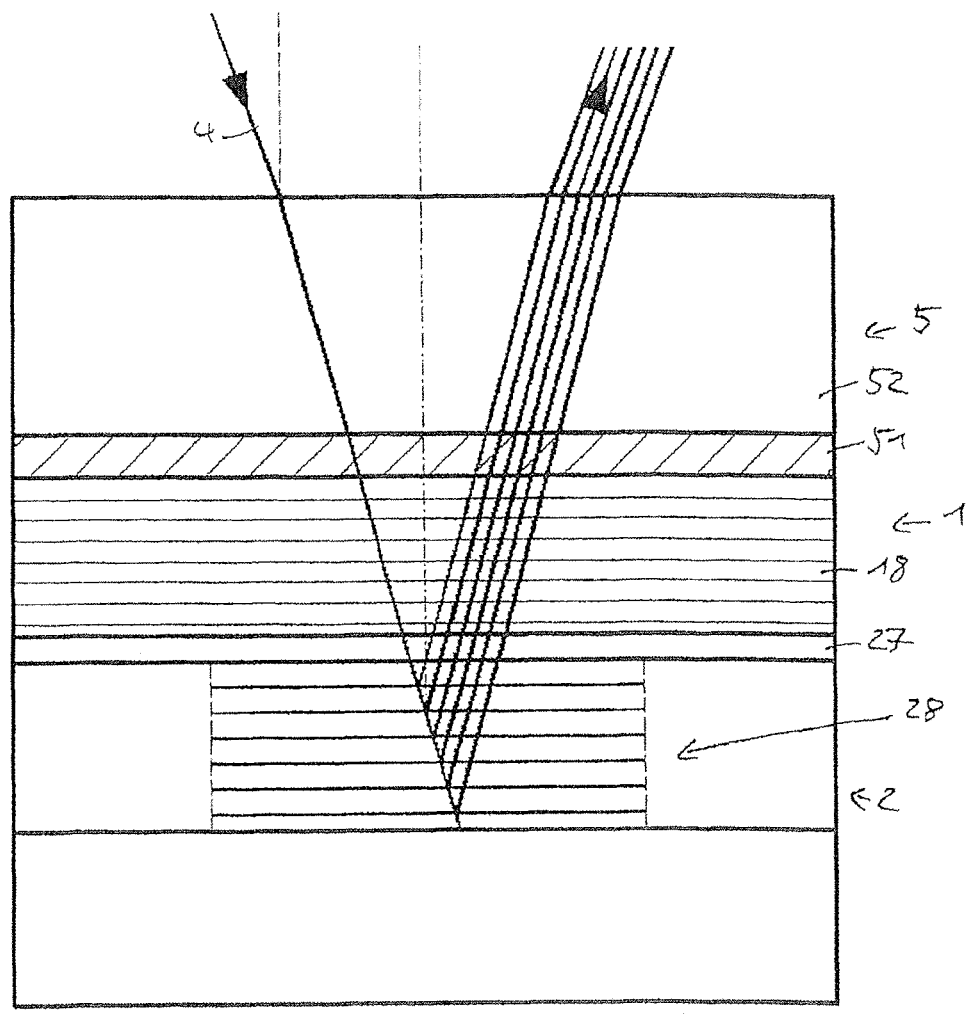
FIG. 24 a schematic illustration of the exposure of a volume hologram by means of a volume hologram master.

The surface structures of the master 2 can also be sealed with a thin and transparent sealing layer 27 (see FIG. 22). Alternatively, the sealing layer 27 can also be thicker and cover or level off the structures completely (see FIG. 23). Masters 2 which have a volume hologram 28 instead of a surface relief can furthermore also be used (see FIG. 24). This volume hologram master 2 can also optionally be provided with a sealing layer 27. It is likewise conceivable to form the master from a combination of a surface structure and a volume hologram, wherein the surface structure and the volume hologram can be arranged adjacent to each other and/or overlapping each other.

Figure 3:
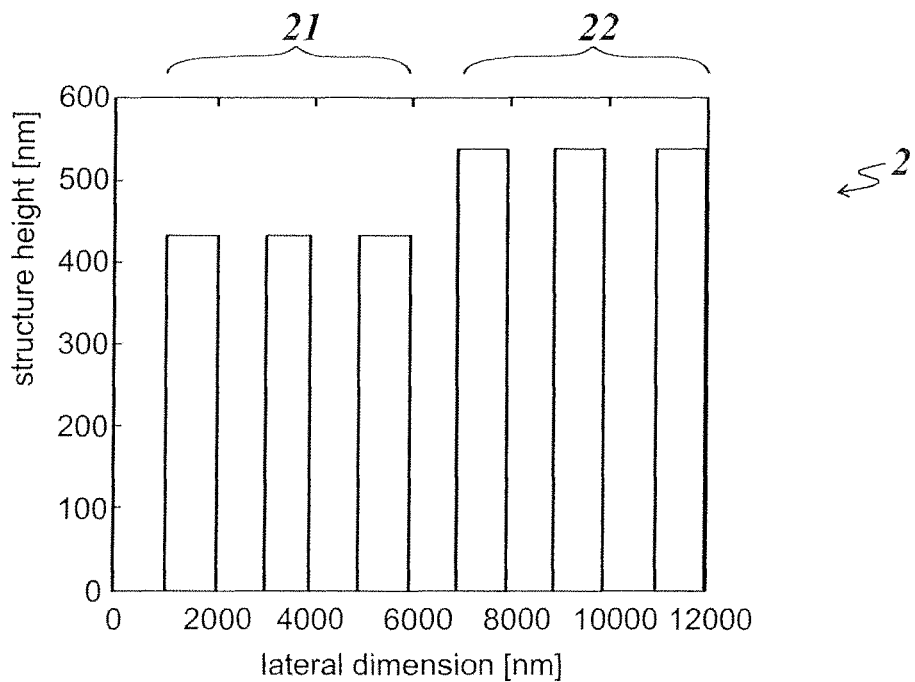
FIG. 3 a schematic sectional representation through an embodiment example of a master for the production of a multicolored volume hologram.

A first example of the surface structure of a master 2 is shown in FIG. 3. It is a binary grating.

Figure 4:
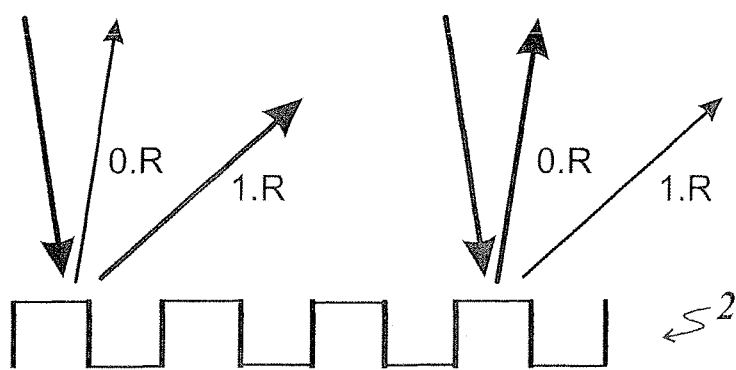
FIG. 4 a schematic representation of the diffraction of light of a first wavelength at the master according to FIG. 3.
Figure 5:
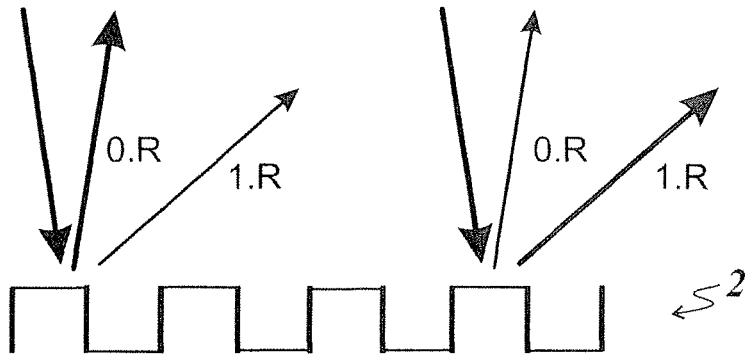
FIG. 5 a schematic representation of the diffraction of light of a second wavelength at the master according to FIG. 3.

Binary gratings are gratings with an essentially rectangular grating profile. Elevations and valleys with essentially perpendicular edges thus alternate. Deep binary gratings can be designed such that they act like a mirror for a first wavelength, i.e. reflect strongly in the zero order, but have a weak zero order for a second wavelength and rather diffract this strongly in the first order. The desired wavelength-specific partial areas 21, 22 of the master 2 can thus be produced particularly easily. This is illustrated in FIGS. 4 and 5.

In the first partial area, such a master has a strong zero order and weak first order for red light and in the second partial area a strong zero order and weak first order for green light. In this way, optically attractive two-colored, red-green volume holograms can thus be produced.

It is accordingly possible to produce differently colored volume holograms with differently designed masters. In particular, the following color combinations are of interest, for example: red-turquoise, red-blue, orange-turquoise, orange-blue, yellow-turquoise, yellow-blue. The structure depths for the two binary gratings of a particular color combination are obtained by using the "overphasing" described above and determining the "overphasing" factor "n", such that one binary grating acts like a mirror for a first wavelength, i.e. reflects strongly in the zero order, but has a weak zero order for a second wavelength and rather diffracts strongly into the first order. For this, calculations are generally carried out by means of precise electromagnetic diffraction theory.

The essential structural parameter for this wavelength specificity is the structure depth of the binary grating. As can be seen in FIG. 3, the surface structure of the master 2 in the partial areas 21 and 22 merely differs by the structure depth.

Figure 6:
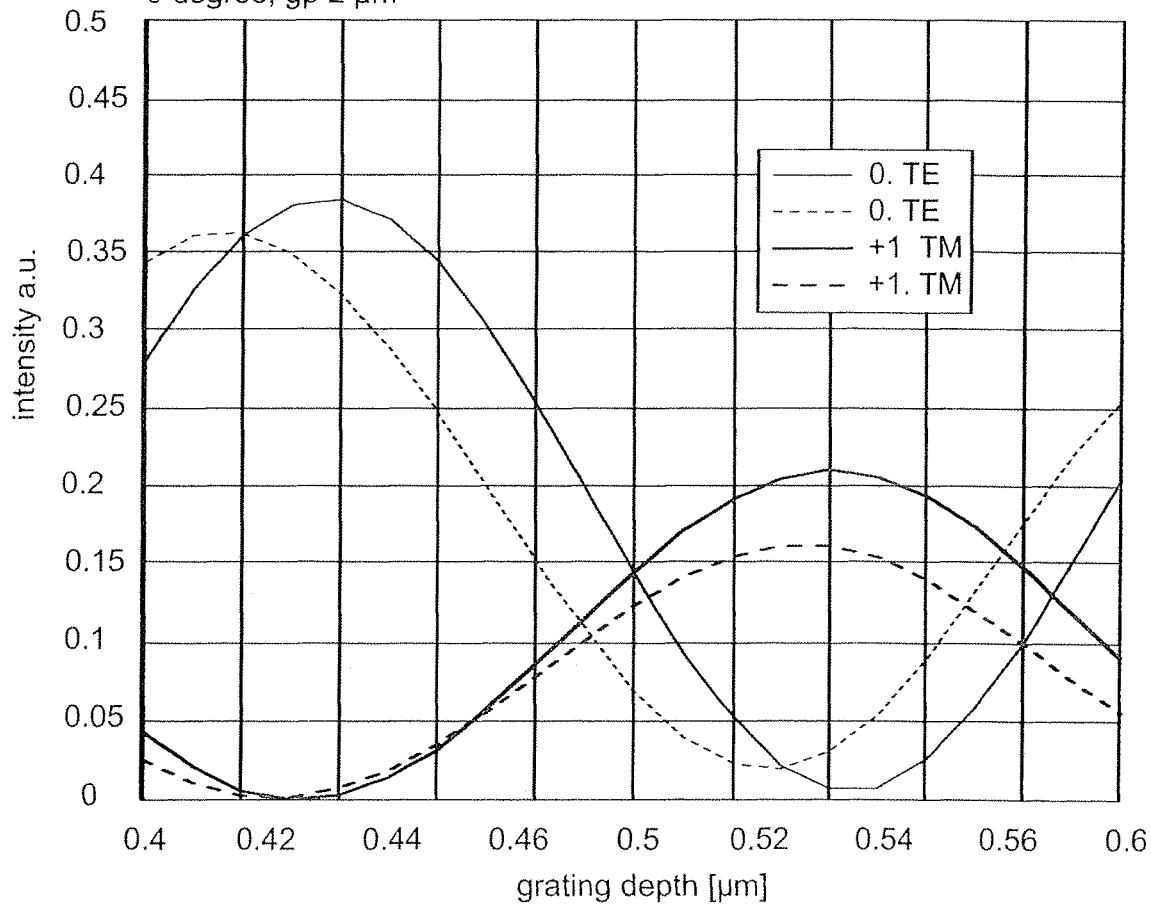
FIG. 6 a graphic representation of the dependence of the diffraction intensity of red light at a binary grating with a grating period of 2 μm on the structure depth of the grating.
Figure 7:
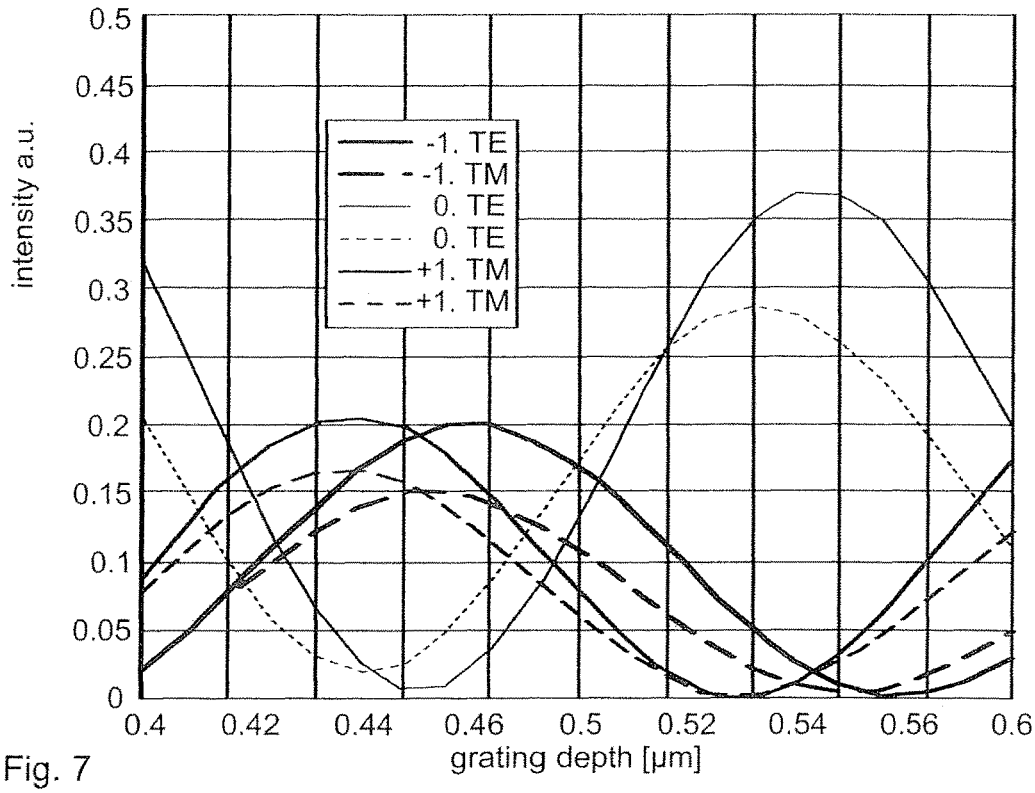
FIG. 7 a graphic representation of the dependence of the diffraction intensity of green light at a binary grating with a grating period of 2 μm on the structure depth of the grating.
Figure 8:
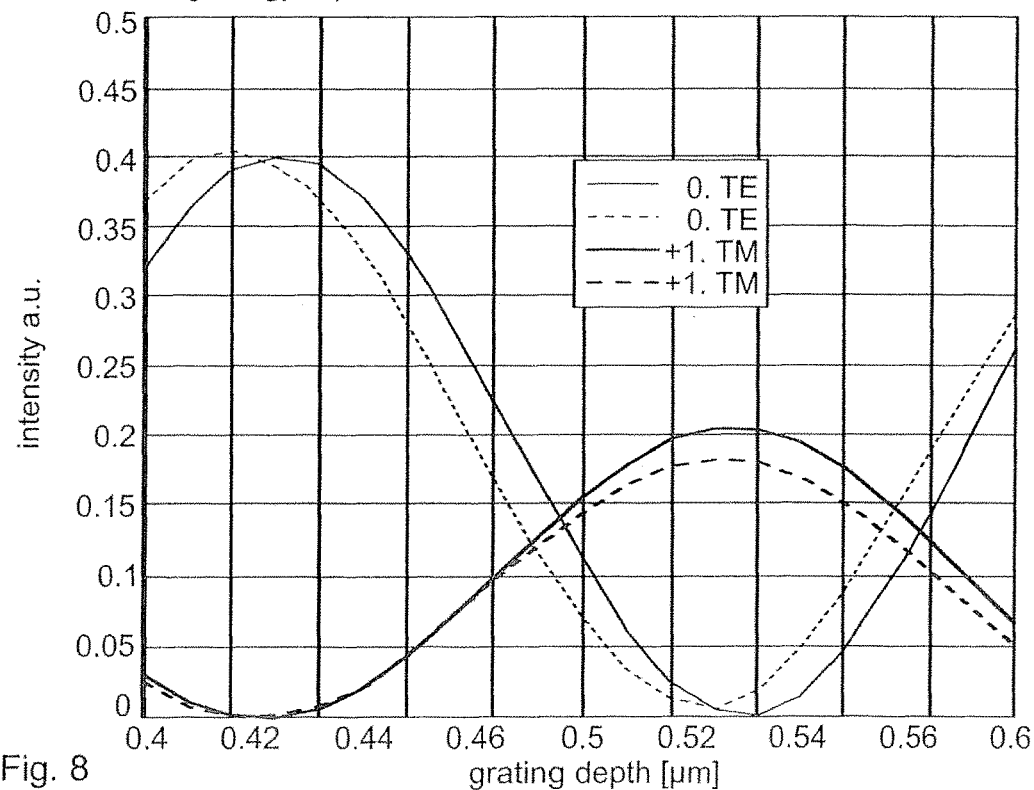
FIG. 8 a graphic representation of the dependence of the diffraction intensity of red light at a binary grating with a grating period of 3 μm on the structure depth of the grating.
Figure 9:
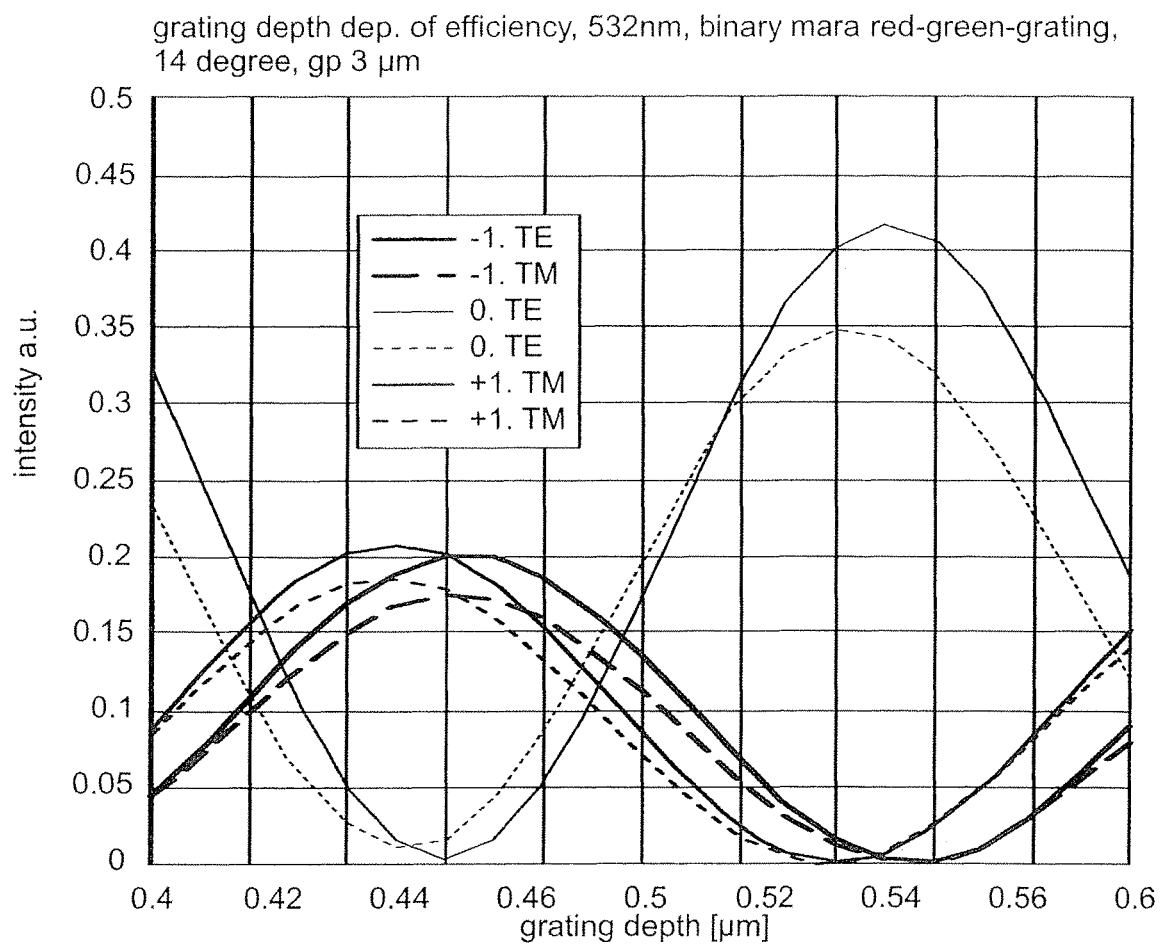
FIG. 9 a graphic representation of the dependence of the diffraction intensity of green light at a binary grating with a grating period of 3 μm on the structure depth of the grating.

The strict dependence of the diffraction intensity on the structure depth is illustrated in FIGS. 6 to 9 for various exposure wavelengths and angles of incidence. It can clearly be seen that, for example in the case of an angle of incidence of 0° and a grating period of 2 μm, a high diffraction efficiency is achieved for red light at 640 nm at a structure depth of 440 nm in the zero order and at a structure depth of 540 nm in the first order (FIG. 6). When irradiating with green light of 532 nm, by contrast, a high efficiency is achieved in the zero order at a structure depth of 550 nm and in the first order at a structure depth of 470 nm (FIG. 7). For a given structure depth, such binary gratings thus have a high wavelength selectivity. This also applies to gratings with a period of 3 μm (FIGS. 8 and 9). The combination of binary gratings with partial areas 21, 22 of different structure depth, represented in FIG. 3, is therefore highly suitable for producing the desired differently colored areas 11, 12 of the volume hologram.

Figure 10:
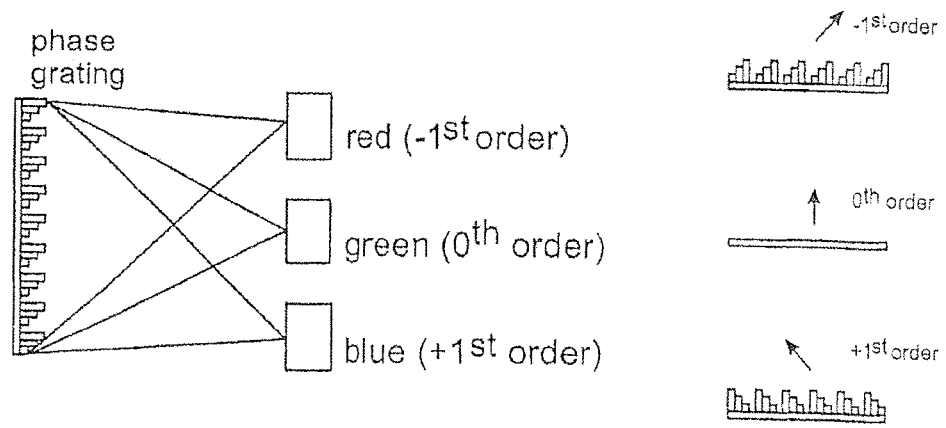
FIG. 10 a schematic sectional representation through an embodiment example of a master with an echelon grating for the production of a multicolored volume hologram.

In addition to the described binary gratings, multistep gratings can also be used, as represented in FIG. 10. Instead of alternating valleys and peaks, these have, in profile, a repeating sequence of steps with increasing and decreasing structure depth respectively.

Such structures, also known as phase gratings, have a particularly high wavelength sensitivity and can be used in particular to produce more than two colors in the volume hologram. When three primary colors, e.g. RGB (Red Green Blue), are used, the production of true-color holograms with high register accuracy is thus possible.

It is advantageous if a master is used the structure depth of which differs by from 80 nm to 600 nm, preferably from 120 nm to 400 nm, between adjacent steps.

It is furthermore possible for a master with a blazed grating to be used. This is illustrated in FIGS. 11 to 13.

In contrast to the binary gratings already described, blazed gratings have a sawtooth-shaped cross-sectional profile. Depending on the angle of incidence during the exposure, the diffraction angle of the diffracted light also changes and consequently also the distance between the Bragg planes in the exposed volume hologram. In this way, multicolored holograms can likewise be produced using a single master.

Figure 11:
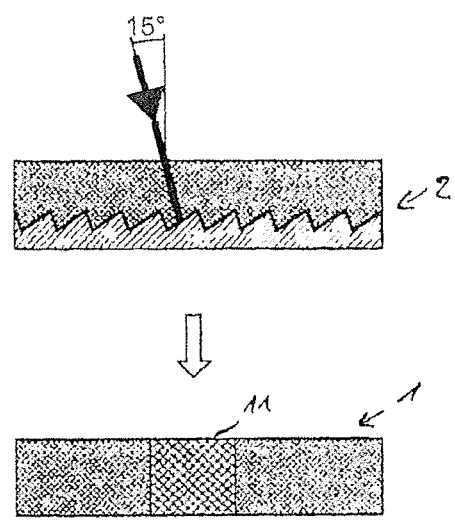
FIG. 11 a schematic sectional representation through an embodiment example of a master with a blazed grating for the production of a multicolored volume hologram at an exposure angle of 15°.
Figure 12:
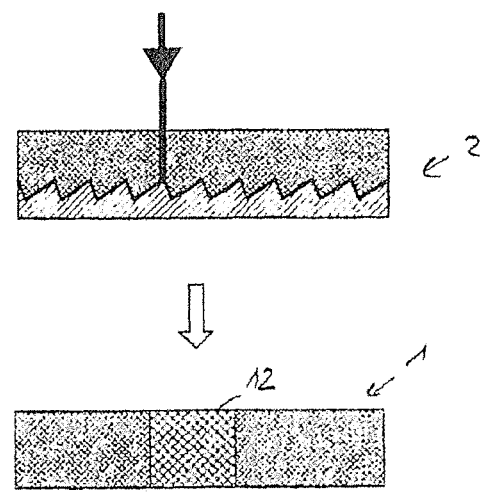
FIG. 12 a schematic sectional representation through an embodiment example of a master with a blazed grating for the production of a multicolored volume hologram at an exposure angle of 0°.

As shown in FIG. 11, when exposing with a green laser with a wavelength of 532 nm and an angle of incidence of 15° to the surface normal of an exemplary blazed grating, a green area is produced in the resulting volume hologram.

Figure 13:
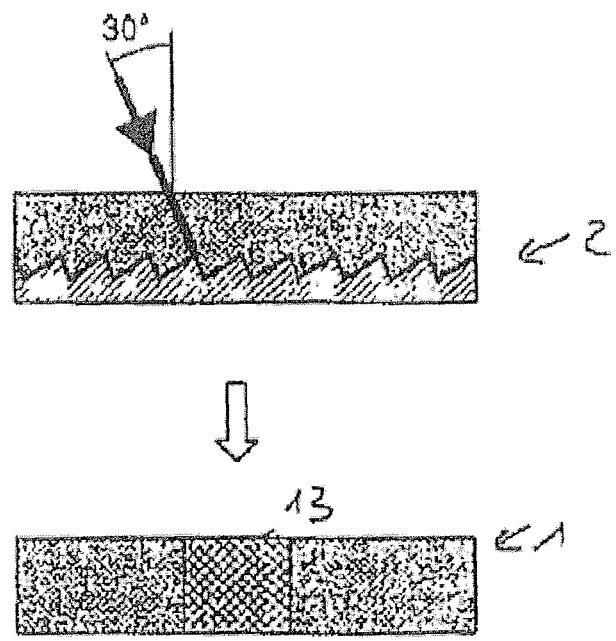
FIG. 13 a schematic sectional representation through an embodiment example of a master with a blazed grating for the production of a multicolored volume hologram at an exposure angle of 0°.

Under otherwise identical conditions, at an angle of incidence of 0° a blue-green area is obtained (FIG. 12) and at an angle of incidence of 30° a yellow-green area (FIG. 13).

Figure 14:
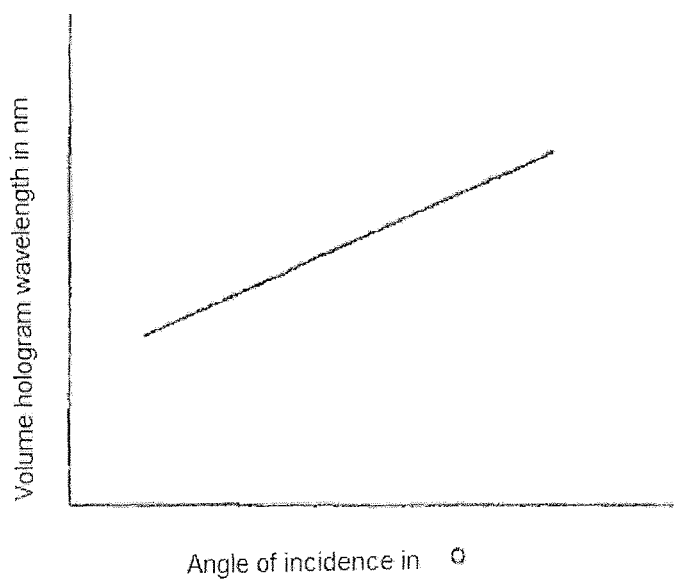
FIG. 14 a graphic representation of the dependence between angle of incidence and resulting wavelength for a blazed grating.

On the whole, there is a linear relationship between angle of incidence and the resulting color of the exposed volume hologram for a given exposure wavelength and a given blazed grating, as illustrated in FIG. 14.

The desired effect can be produced by variation of the angle of incidence during the exposure. However, this makes relatively complex control of the exposure laser necessary since the angle of incidence must be varied depending on the position of the laser beam on the master. The achievable resolution would furthermore be restricted by the comparatively large dimensions of the respective local irradiation surface of the exposing laser beam.

Figure 15:
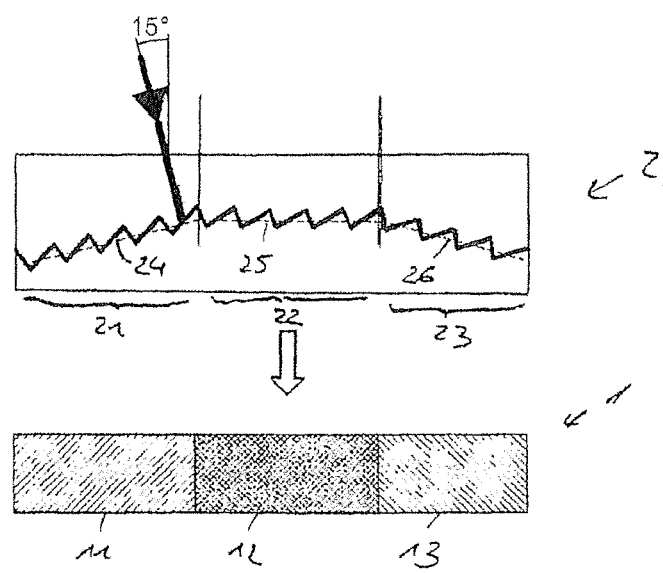
FIG. 15 a schematic sectional representation through an embodiment example of a master with a blazed grating for the production of a multicolored volume hologram with grating planes inclined with respect to each other.
Figure 17:
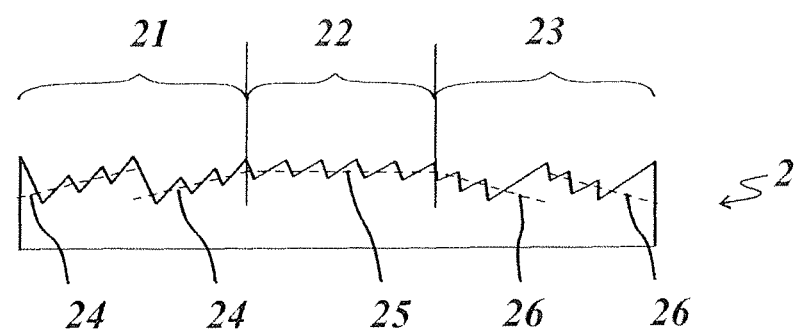
FIG. 17 a schematic sectional representation through the master according to FIG. 16.

It is therefore expedient if a master 2 is used in which the blazed grating is arranged on planes 24, 25, 26 inclined relative to each other in several partial areas 21, 22, 23. An embodiment example of such a master 2 is shown schematically in FIG. 15 and FIG. 17.

In the case of such a master 2, if the angle of incidence of the light used for the exposure relative to the surface normal of the master 2 is kept constant, different angles of incidence relative to the blazed gratings arranged there nevertheless result for the partial areas 21, 22, 23, with the result that, for the light diffracted towards corresponding areas 11, 12, 13 of the volume hologram, different diffraction angles and thus different colors arise in the areas. This enables a particularly simple exposure.

Other diffractive structures such as linear or crossed sinusoidal gratings, linear or crossed binary gratings, Fresnel lens-like structures or the above structures combined with isotropic or anisotropic mat structures can also be used instead of blazed gratings. In particular, linear sinusoidal grating structures with a structure depth which gives a maximum diffraction efficiency in an order higher than the first diffraction order can advantageously be used here.

It is advantageous if the planes are inclined by from 5° to 90°, preferably from 20° to 60°, with respect to each other.

Figure 16:
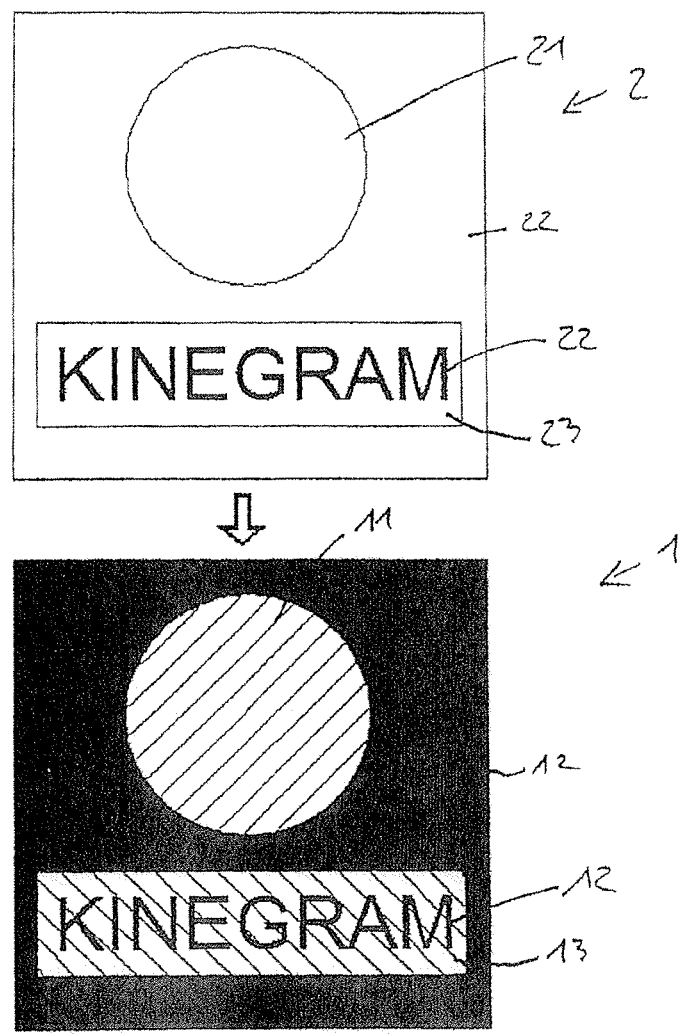
FIG. 16 a schematic top view of an embodiment example of a master with a blazed grating for the production of a multicolored volume hologram with grating planes inclined with respect to each other, as well as the resulting hologram.

The partial areas 21, 22, 23 can also be arranged in complex patterns in order to realize any graphic designs. A schematic top view of such a master 2 and the resulting volume hologram 1 is shown in FIG. 16.

Figure 18:
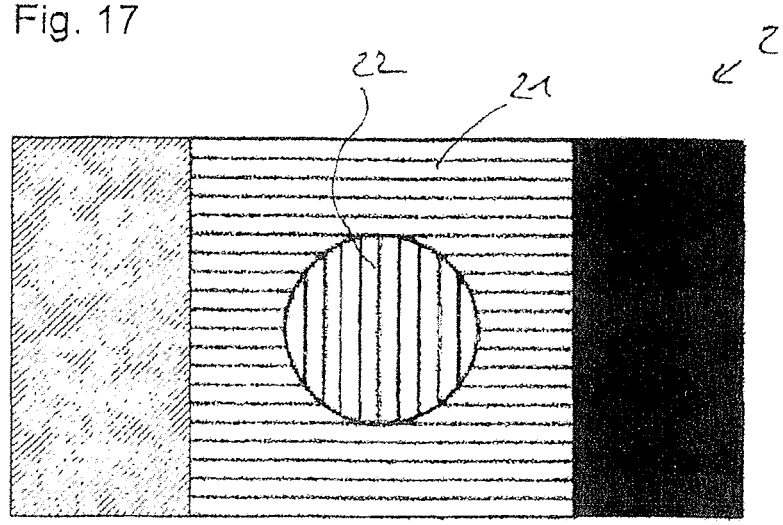
FIG. 18 a schematic top view of an embodiment example of a master with a polarization filter for the production of a multicolored volume hologram.

A further alternative embodiment of a master 2 is represented in FIG. 18. The wavelength selectivity of the partial areas 21, 22 is achieved here by means of respective polarizing structures.

If, for example, in the first partial area a polarizing structure is provided and the master 2 is irradiated with light, the plane of polarization of which is perpendicular to the plane of polarization of this polarizing structure, the first partial area is selectively excluded from the exposure. For example, light of a different wavelength which is polarized parallel to the plane of polarization of the polarizing structure can then be used for the exposure, with the result that the first partial area is now selectively exposed.

In contrast, the plane of polarization of the polarizing structure in the second partial area is preferably arranged perpendicular to that of the polarizing structure in the first partial area. During the first exposure, the second partial area is therefore selectively exposed and during the second exposure is excluded from the exposure.

If the exposures take place at different wavelengths, a multicolored volume hologram can in this way also be produced using a single master.

Figure 25:
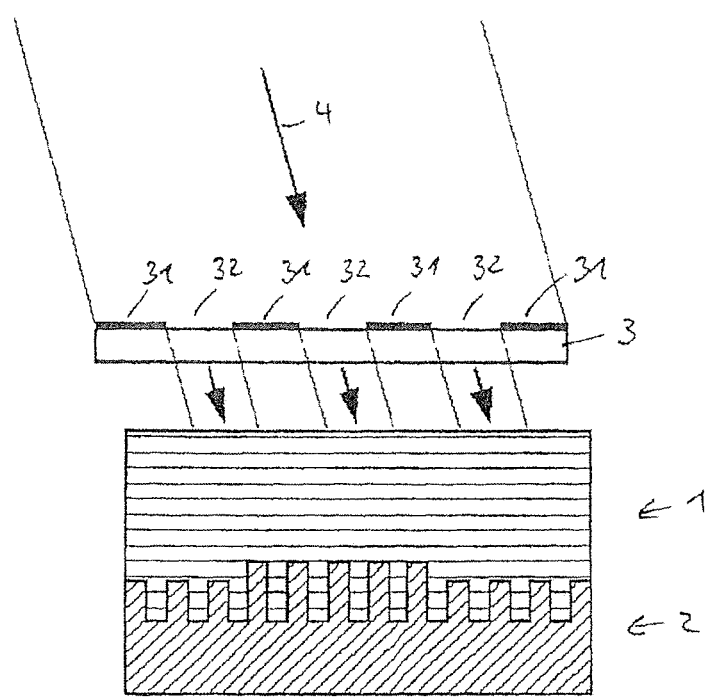
FIG. 25 a schematic illustration of the gridded exposure of a volume hologram by means of a master and a grid mask.

In all the embodiments described above, the exposure can take place over the whole surface. However, it has been shown that particularly good results can be obtained by a grid exposure. This is represented by way of example in FIG. 25. For this, a grid mask 3 is arranged between the exposing laser beam and the master 2. If several exposures are carried out, a grid exposure can also be combined with an exposure over the whole surface.

Figure 26:
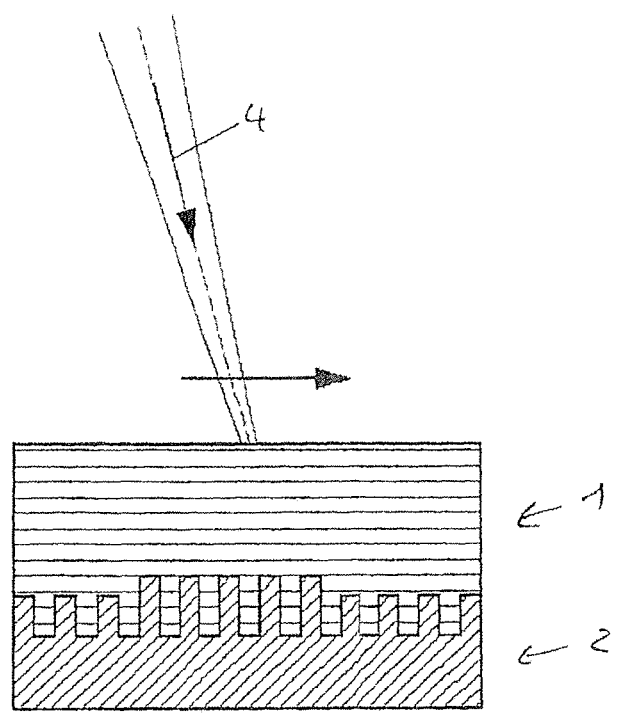
FIG. 26 a schematic illustration of the gridded exposure of a volume hologram by means of a master and periodic modulation of an exposure laser.

Instead of a mask, a gridded exposure can also be used in which a scanning and, where appropriate, focused first laser beam is intensity-modulated (see FIG. 26). The laser beam is preferably switched on and off (by internal or external modulation). Alternatively, the laser beam can be expanded and a so-called spatial light modulator can be used, which modulates the intensity distribution. If several exposures are carried out, the gridded exposure can also be combined with an exposure over the whole surface.

This is expedient in particular if small, i.e. highly resolved, color areas forming the grid are to be combined in order to produce a mixed color impression. A grid arrangement may also be expedient for the production of a light colored background for a motif, in particular for the production of a half-tone of the background color.

Figure 19:
FIG. 19 a schematic representation of a grid mask for the exposure of a volume hologram.

Examples of grid masks 3 formed as dot or line grids are represented in FIG. 19.

By dot grids are generally to be meant grids which are composed of distinct, small elements. These can be circular, but also adopt different structures such as, for example, stars, squares, alphanumeric characters and the like.

The grid preferably has a grid width of from 50 µm to 300 µm.

Figure 20:
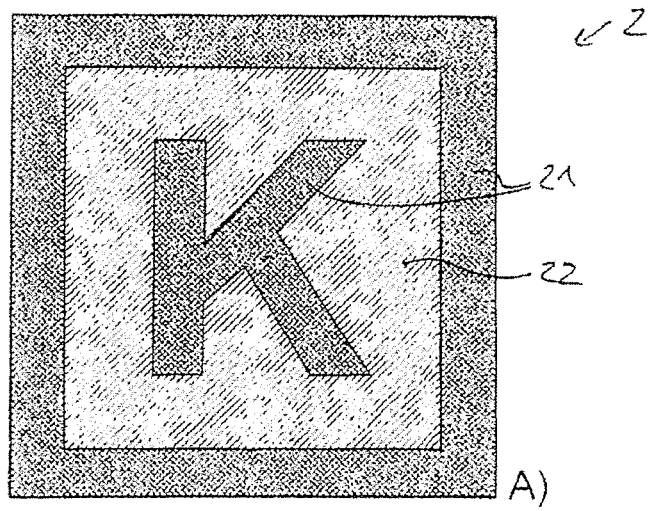
FIGS. 20A-E a schematic representation of the production steps for a gridded volume hologram.
Figure 20:
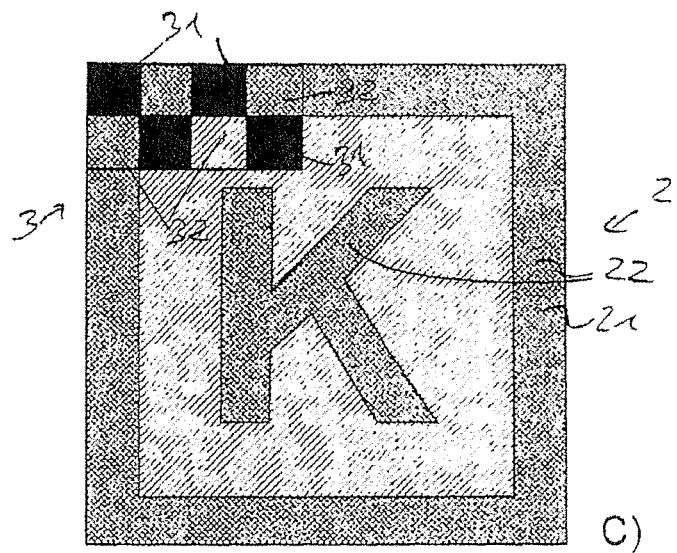
Figure 20:
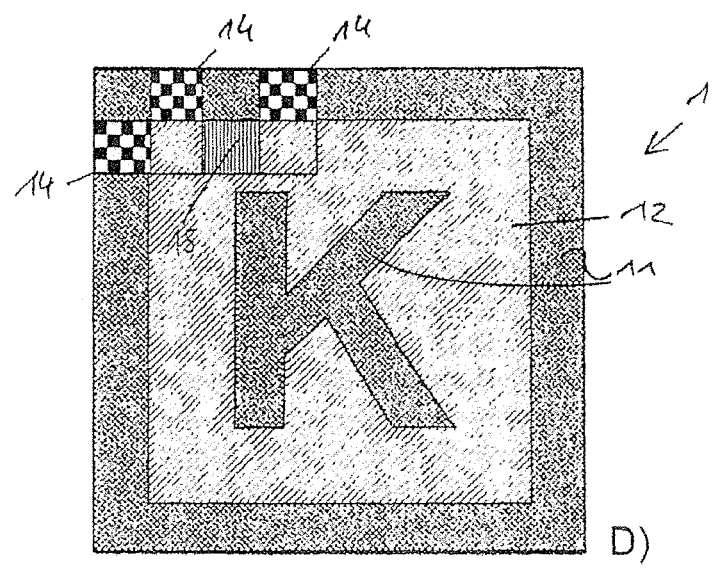
Figure 20:
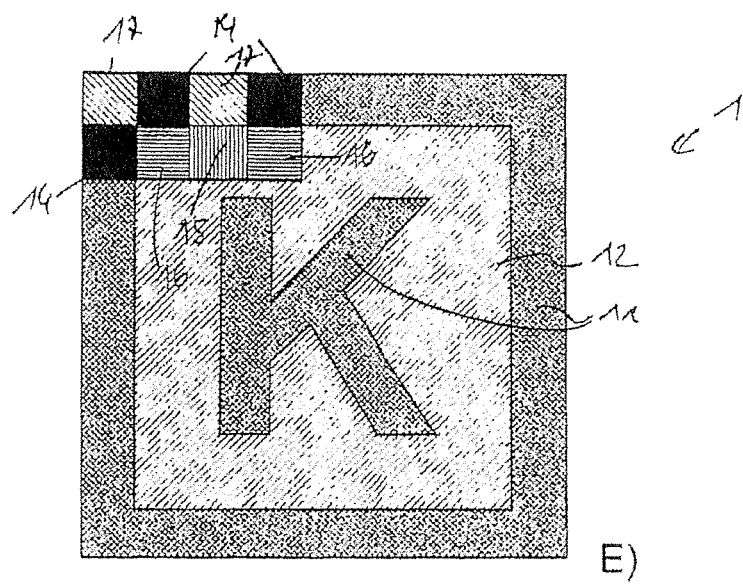
Figure 20:
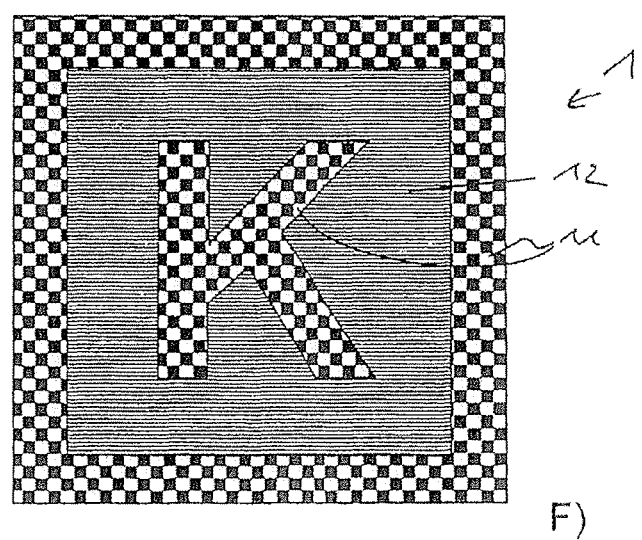

In FIG. 20, the production of a multicolored gridded volume hologram is represented in detail. For this, the master shown in FIG. 20A is first of all provided, the partial areas 21, 22 of which form a logo here. For the partial areas 21, 22 of the master, all the surface structures described above for the production of the desired wavelength selectivity can be used.

For the first exposure, the grid mask 3 shown in FIG. 20B is arranged in the beam path with non-transparent areas 31 and transparent areas 32 such that it overlaps the master 2, as partially represented in FIG. 20C. The exposure then takes place to red light, which is strongly diffracted by the first partial area 21 and weakly diffracted by the second partial area 22.

The intermediate product shown in FIG. 20D is thus obtained. In the first area 11 of the volume hologram in which the red light was diffracted by the first partial area 21 of the master 2, a pattern of intense red pixels 14 is formed, while in the second area 12, only a weak exposure takes place and thus only weak red pixels 15 are formed.

The grid mask is then removed and a further exposure to green light carried out. This takes place over the whole surface. The green light is now strongly diffracted by the second partial area 22 of the master with the result that intense green pixels 16 are now formed in the hitherto non-exposed parts of the second area 12 of the volume hologram 1, as shown in FIG. 20E, while only weak green pixels 17 are formed in the first area 11. By controlling the ratio of the light intensities of the first and second exposures, the color impression can be varied slightly.

Overall, the volume hologram 1 represented in FIG. 20F is thus produced with a red logo on a green background with a red border. The grid width of the mask used preferably lies below the resolution capacity of the human eye, resulting in a continuous color impression.

LIST OF REFERENCE NUMBERS 1 volume hologram
11 area
12 area
13 area
14 pixel
15 pixel
16 pixel
17 pixel
18 volume hologram layer
2 master
21 partial area
22 partial area
23 partial area
24 plane
25 plane
26 plane
27 varnish layer
3 grid mask
31 area
32 area
4 laser beam
5 layer structure
51 varnish layer
52 carrier layer

The invention claimed is:

1. A method for producing a volume hologram with at least one first area in a first color and at least one second area in a second color, the method comprising:
  a) providing a volume hologram layer made of a photopolymer;
  b) arranging a master with a surface structure on the volume hologram layer; and
  c) exposing the master using coherent light, wherein light which is incident on at least one first partial area of the surface of the master is diffracted or reflected in the direction of the at least one first area of the volume hologram layer and light which is incident on at least one second partial area of the surface of the master is diffracted or reflected in the direction of the at least one second area of the volume hologram, and wherein the light diffracted or reflected by the first and second partial areas differs in at least one optical property,
  wherein the exposure takes place in at least two successive exposure steps, and
  wherein at least one of the exposure steps is carried out over the whole surface of the two partial areas such that the at least one first area in a first color of the volume hologram is produced in a desired fixed positional register relationship with respect to the at least one second area in a second color of the volume hologram.

2. The method according to claim 1, wherein the light diffracted or reflected by the first and second partial areas differs by at least 10% in intensity for a predetermined diffraction order and/or reflection direction and/or wavelength.

3. The method according to claim 1, wherein a master with a binary grating is used.

4. The method according to claim 3, wherein a master is used which has a binary grating with a different structure depth in the first and second partial areas.

5. The method according to claim 4, wherein a master is used which in the first partial area has a structure depth of from 350 nm to 510 nm, and, in the second partial area, has a structure depth of from 450 nm to 630 nm.

6. The method according to claim 4, wherein a master is used which has a grating period of from 500 to 10,000 nm.

7. The method according to claim 1, wherein a master is used which has a four-step grating.

8. The method according to claim 7, wherein a master is used, the structure depth of which differs by from 80 nm to 600 nm between adjacent steps.

9. The method according to claim 3, wherein a master with a blazed grating is used.

10. The method according to claim 9, wherein a master is used in which the blazed grating is arranged on planes inclined relative to each other in the first and in the second partial area, wherein the absolute angle of inclination of the blazed gratings arranged in the first and second partial areas is different with respect to the plane spanned by the volume hologram layer.

11. The method according to claim 10, wherein the planes are inclined by from 5° to 90° with respect to each other.

12. The method according to claim 1, wherein a master is used which has a Fabry-Pérot layer system.

13. The method according to claim 12, wherein a distance between the planes of the Fabry-Pérot layer system differs by from 10 nm to 200 nm between the first and the second partial area.

14. The method according to claim 1, wherein a master is used in which a polarizing structure is provided in the first and/or second partial area.

15. The method according to claim 14, wherein a master is used in which the direction of polarization of the polarizing structure differs between the first and the second partial area.

16. The method according to claim 14, wherein a master is used which has in each case in the first and second partial areas a zero-order diffraction structure with a grating period which is smaller than the wavelength of the light used for the exposure of the master or a blazed grating with a polarizing superlattice, wherein the respective diffraction structures influence the polarization of the incident light differently.

17. The method according to claim 1, wherein the exposure steps are carried out at a different wavelength and/or different exposure angle of the incident light.

18. The method according to claim 1, wherein one of the exposure steps is carried out at a wavelength of from 600 nm to 660 nm and another of the exposure steps is carried out at a wavelength of from 500 nm to 560 nm.

19. The method according to claim 1, wherein the planes of polarization of the light used for two of the exposure steps differ by 45° to 135°.

20. The method according to claim 1, wherein at least one of the exposure steps is carried out in a grid.

21. The method according to claim 20, wherein the grid is a dot or line grid.

22. The method according to claim 20, wherein the grid has a grid width of from 50 µm to 300 µm.

23. The method according to claim 20, wherein a plurality of exposure steps is carried out in which the exposure takes place in each case in dot grids offset with respect to each other.

24. The method according to claim 1, wherein the exposure takes place with a light intensity of from 2 mJ/cm$^2$ to 200 MJ/cm$^2$.

25. The method according to claim 1, wherein the light intensity is modulated periodically during the exposure in order to produce a grid.

26. The method according to claim 1, wherein the first and/or second area forms a symbol, logo, image, or alphanumeric character.

27. The method according to claim 1, wherein, after the exposure, the volume hologram layer is fixed by curing.

28. A master for use with a method according to claim 1 comprising a surface structure with a first and a second partial area which differ in their optical properties.

29. The master according to claim 28, wherein light diffracted or reflected by the partial areas differs by at least 10% in intensity for a predetermined diffraction order and/or reflection direction and/or wavelength.

30. The master according to claim 28, wherein the surface structure comprises a binary grating, a multistep phase grating, a blazed grating, or combinations thereof.

31. The master according to claim 28, wherein the master comprises a metallic base body made of nickel.

32. The master according to claim 28, wherein the master comprises at least one further surface structure which is arranged adjacent to or overlapping the surface structure.

33. The master according to claim 28, wherein the master comprises a varnish layer which covers the surface structure.

34. A security element with a volume hologram layer, in which a volume hologram with at least two areas of different color is formed, obtained by a method according to claim 1.

35. The security element according to claim 34, wherein the volume hologram layer is formed from a photopolymer, silver halide emulsions or dichromatic gelatin.

36. The security element according to claim 34, wherein the volume hologram layer has a layer thickness of from 3 µm to 100 µm.

37. The security document with a security element according to claim 34.

38. A security document according to claim 37, wherein the security document is formed as an identification document, passport document, visa document, credit card, banknote.

* * * * *